Figures 3, 3A:
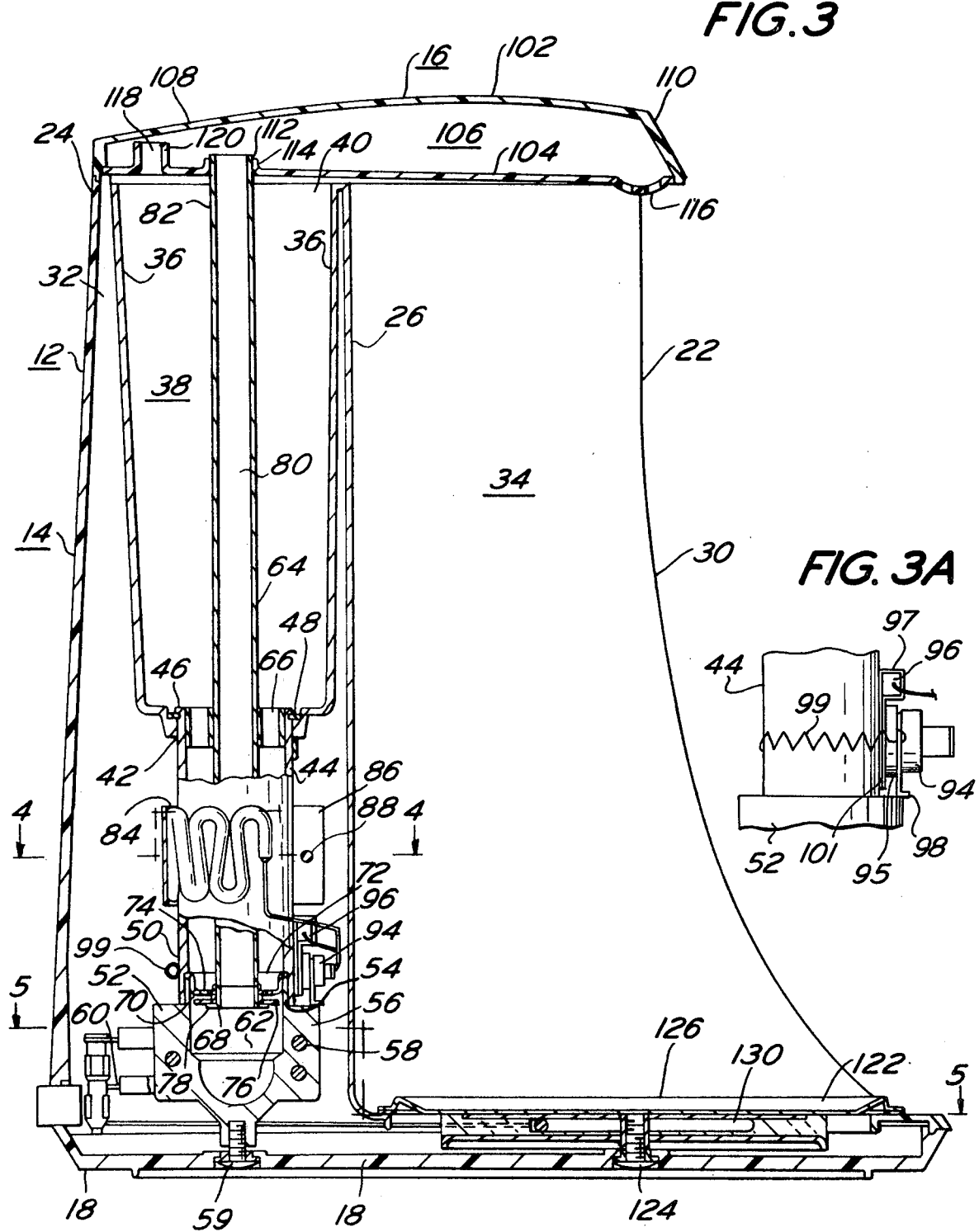

United States Patent [19]
Bergmann et al.

[11] 3,987,717
[45] Oct. 26, 1976

[54] AUTOMATIC COFFEE BREWING MACHINE

[75] Inventors: Karl H. Bergmann, Cherry Hill, N.J.; Harvey Levine, Fairfield, Conn.

[73] Assignee: Melitta, Inc., Cherry Hill, N.J.

[22] Filed: Oct. 10, 1975

[21] Appl. No.: 621,390

Related U.S. Application Data

[63] Continuation-in-part of Ser. No. 490,063, July 19, 1974, abandoned.

[52] U.S. Cl. .................................. 99/280; 99/294; 219/442
[51] Int. Cl.² ........................................ A47J 31/56
[58] Field of Search ................ 99/294, 279–285, 99/290, 293–294, 300–301, 302, 304, 307, 310, 313, 325–336; 126/344, 350 B, 380, 387; 219/438–439, 441–442

[56] References Cited
UNITED STATES PATENTS

| | | | |
|---|---|---|---|
| 3,100,434 | 8/1963 | Bunn | 99/282 |
| 3,530,276 | 9/1970 | Wells | 99/282 X |
| 3,589,271 | 6/1971 | Tarrant et al. | 99/280 |
| 3,596,588 | 8/1971 | Moss | 99/282 |
| 3,641,918 | 2/1972 | Schellgell et al. | 99/279 |
| 3,781,521 | 12/1973 | Kircher | 219/442 |
| 3,844,206 | 10/1974 | Weber | 99/282 |
| 3,869,968 | 3/1975 | Ihlenfeld | 99/280 |

Primary Examiner—Peter Feldman
Assistant Examiner—Arthur O. Henderson
Attorney, Agent, or Firm—Jacob Trachtman

[57] ABSTRACT

In an automatic coffee brewing machine of the type having container means for receiving cold water at the start of a brewing operation and dispensing hot water at the end of the brewing operation, a control means comprising heating means activated to its closed position when sensing a temperature below a predetermined first value resulting when said container means receives cold water at the start of a brewing operation and being activated to its open position when it senses a temperature above a predetermined second value higher than said first value, electrical connecting means joining said switch means with said heating means, and a heating element for heating said switch means when the switch means is in its open position, so that when said switch is in its closed position at the start of a brewing operation the heating means is fully energized to heat the container means and the water contained therein until said switch means is activated to its open position when the temperature of the container exceeds said second value after which the energization of said heating element maintains the temperature sensed by said switch means at a level between said first and second values which prevents said switch means from being activated to its closed position and reheating the container before the start of a new brewing operation.

20 Claims, 2 Drawing Figures

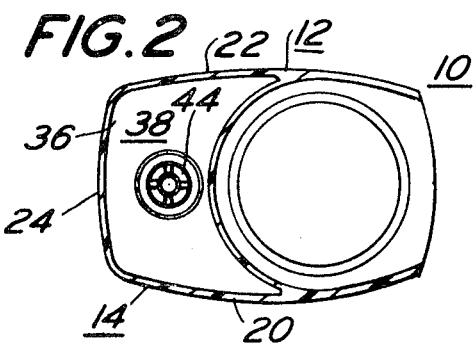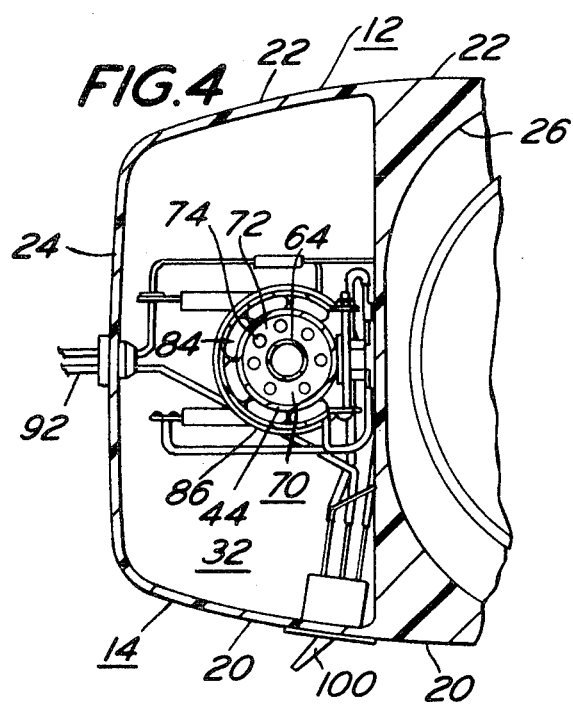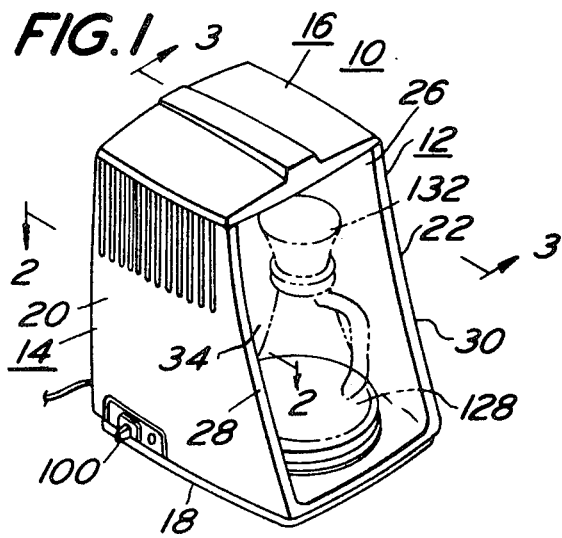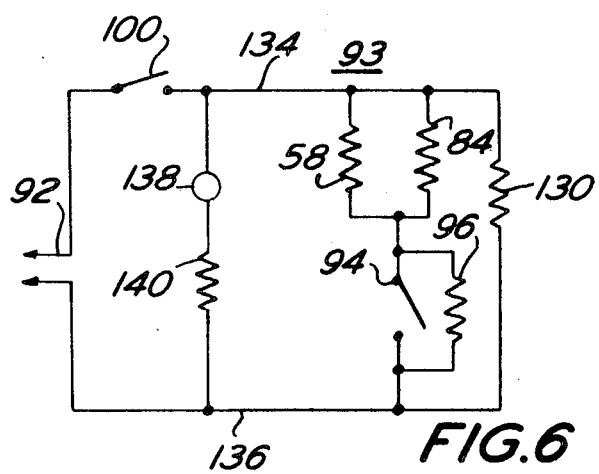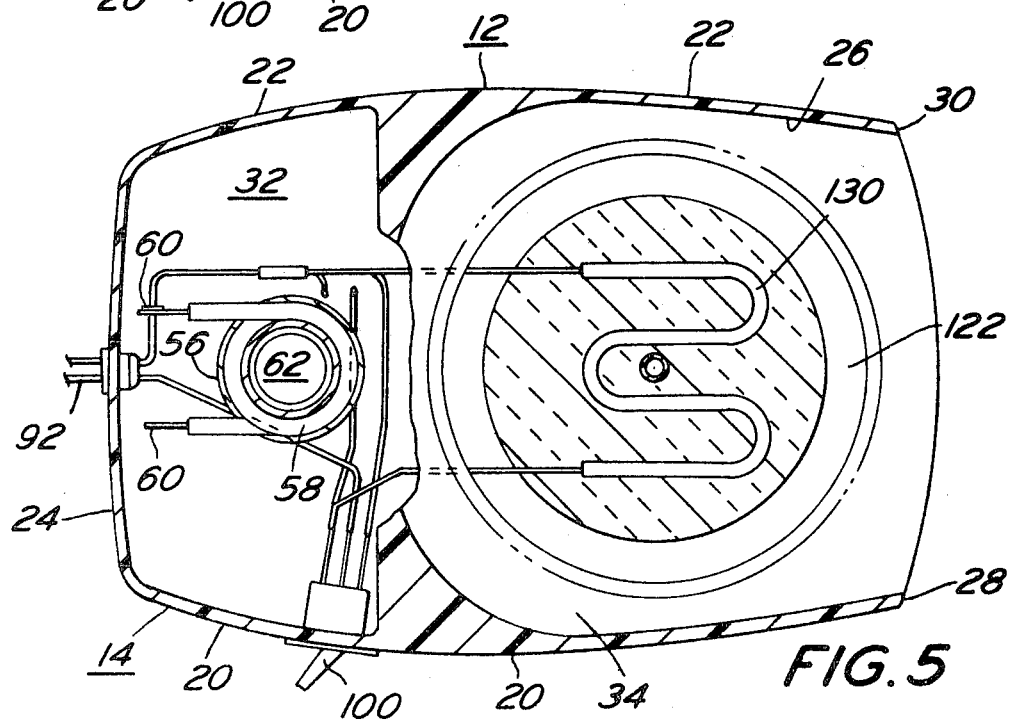

U.S. Patent   Oct. 26, 1976   Sheet 2 of 2   3,987,717

AUTOMATIC COFFEE BREWING MACHINE

This is a continuation-in-part of our pending application Ser. No. 490,063 filed July 19, 1974, now abandoned entitled Automatic Coffee Brewing Device.

The invention relates to an automatic coffee making machine or device, and particularly to a coffee brewing machine or device which automatically heats and dispenses a quantity of hot water for one pass through ground coffee beans and a filter after which it is received in a carafe which is warmed until the brewed coffee is used.

Heretofore, coffee brewing devices have been made for preparing coffee by passing heated water through ground coffee beans and filter paper in a manner similar to that provided by the present invention. In brewing coffee by this method, it is essential that the water passed through the ground coffee beans be maintained within a desirable range of temperatures and at a temperature below the boiling point of water to enhance the quality of the brewed coffee. It is also desirable to efficiently produce a predetermined quantity of coffee when required by starting with cold water and providing same within a matter of minutes ready for use at a desired temperature.

It is therefore a primary object of the invention to provide a new and improved automatic coffee brewing device which accurately controls the temperature of the water passed through the ground coffee beans for obtaining a high quality coffee beverage.

Another object of the invention is to provide a new and improved automatic coffee brewing device which can efficiently prepare a predetermined quantity of coffee starting with cold water.

Another object of the invention is to provide a new and improved automatic coffee brewing device which quickly brews fresh coffee within a matter of minutes after starting the brewing operation and is prevented from temperature recycling until after a new charge of cold water is received by the device.

Another object of the invention is to provide a new and improved automatic coffee brewing device which is inexpensive to manufacture, durable and trouble free in operation.

The above objects as well as many other objects of the invention are achieved by providing an automatic coffee brewing device comprising a structure having a cavity therein providing a reservoir for receiving water, a water heating and pumping means positioned under the reservoir, and a connecting means for delivering water from the reservoir to the heating and pumping means. The pumping means includes a riser tube extending from the heating means through the connecting means and the reservoir, the tube being heat conductive for transferring heat from the fluids pumped therethrough to the water in the connecting means and reservoir. The connecting means is a vertically extending tube depending from the reservoir and having a reduced water containing capacity with respect to that of the reservoir for causing a higher temperature rise for water contained therein with respect to the water contained in the reservoir.

The structure has an opening at its top communicating with the reservoir for receiving cold water therethrough to fill the reservoir. A cover member is received over and encloses the top opening of the structure and has top and bottom walls enclosing a chamber therewithin. The cover member has a first opening over the reservoir of the struture for removably receiving therethrough the top of the riser tube of the pumping means, and a second opening for providing a water dispensing spout. A third opening in the bottom wall of the cover means is positioned over the reservoir of the structure for venting and returning heated fluid to the reservoir.

The coffee brewing device may also be provided with a supplementary heating element positioned proximate to the connecting means for supplying additional heat to the water in the connecting means prior to its delivery to the heating and pumping means. A warming plate is positioned under the spout of the cover means. A carafe positioned on the warmer plate receives a brew of coffee provided by the heated water from the spout passing through the ground coffee beans and filter, and maintains the brew at a desirable temperature for use.

A control means for the coffee brewing machine or device is provided for energizing the heating and pumping means and includes a temperature sensing thermostatic switch and bypass resistor which are secured by bracket means at the bottom of the connecting tube connected to a power source by a main switch. When the main switch is closed, energization will be provided through the thermostatic switch in its closed condition to the main heating element and a supplementary heating element when utilized. The thermostatic switch is placed in its closed position upon sensing a temperature below a predetermined first value when cold water is received into the reservoir at the beginning of a brewing operation. After the water in the device has been heated and dispensed from the machine, the temperature of the connecting tube rises to a higher second predetermined temperature which is sensed by the thermostatic switch causing it to be activated to its open position. With the thermostatic switch in its open position, the bypass resistor is energized to provide heat to the thermostatic switch to maintain the temperature sensed by the thermostatic switch at a level between the first and second values. This prevents activation of the thermostatic switch to its closed position and energization of the heating elements before the start of a new brewing operation. When cold water is again received in the reservoir of the coffee brewing machine at the beginning of a new brewing operation, the temperature of the connecting tube is reduced to a low level resulting in the thermostatic switch assuming its closed position to restart a heating and pumping operation.

With the foregoing discussion in mind, this invention will be most readily understood from the following detailed description of a representative embodiment thereof, reference for this purpose being had to the accompanying drawing, in which:

FIG. 1 is a perspective view of an automatic coffee brewing device embodying the invention, FIG. 2 is a sectional view taken on line 2—2 of FIG. 1, FIG. 3 is an enlarged sectional view taken on the line 3—3 of FIG. 1, FIG. 3a is an enlarged elevational view of a portion of FIG. 3, FIG. 4 is a sectional view taken on line 4—4 of FIG. 3 with portions broken away, FIG. 5 is a sectional view taken on line 5—5 of FIG. 3, and FIG. 6 is a schematic drawing of the electrical circuit of the automatic coffee brewing device.

Like referenced numerals designate like parts throughout the several views.

Referring to the figures, the automatic coffee brewing device 10 embodying the invention, comprises a structure 12 having a body 14 and a lid or cover 16 which may be made of molded plastic material. The body 14 has a horizontal base 18, with vertical side walls 20 and 22, and a back wall 24, which extends upwardly from the base 18. An intermediate wall 26 meets the downwardly sloping front edges 28 and 30 of the side walls 20 and 22, and curves inwardly to form at its rear an interior region 32 within the body 14, and a recessed region 34 at the front of the body 14.

A vertical wall 36 within the interior region 32 provides an enlarged cavity forming a reservoir 38 at the top of the body 14 having an opening 40 at its top for receiving cold water. The reservoir 38 has an opening 42 at its bottom for delivering water to a connecting tube 44.

The connecting tube 44 has a circular cross section with its top end 46 extending through the opening 42 of the reservoir 38 and locked therewith by a spring washer 48 which is received into an annular groove at the top end 46 of the tube 44. The tube 44 which is positioned below the reservoir 38 has a volume which is greatly reduced with respect to the volume of the reservoir 38. The connecting tube 44 may be made of metal having good thermal transfer characteristics.

The bottom end 50 of the connecting tube 44 is provided with an enlarged inside diameter which is threaded to engage a heating and pumping means 52 at its top end 54 which has threads on its outer surface. The heating and pumping means 52 comprises a unit 56 which may be a diecasting of metal with good thermal transfer characteristics. The unit 56 has embedded therein an insulated electrical winding of a heating element 58 provided with external terminals 60. The winding of the heating element 58 surrounds a well 62 formed in the unit 56 for receiving and heating water from the connecting tube 44.

The unit 56 of the heating and pumping means 52 is secured with the base 18 of the structure 12 by means such as the screw 59 shown in FIG. 3.

The heating and pumping means 52 also includes a riser tube 64 which may be made of a metal having good heat transfer characteristics. The tube 64 extends vertically through the connecting tube 44 and the reservoir 38 and is secured and positioned by a spacer bracket 66 at the top end 46 of the connecting tube 44. The bottom end 68 of the riser tube 64 receives about it a valve means 70 of the pumping means 52.

The valve means 70 comprises a dish shaped stationary portion 72 which has its center fixed about the end 68 of the tube 64 with its outer perimeter received and clamped between the shoulder formed at the bottom of the connecting tube 44 and the top 54 of the heating and pumping means 52. The portion 72 is provided with a plurality of openings 74 in its intermediate portion interconnecting the tube 44 with the well 62 of the heating and pumping means 52. A movable valve disk 76 is received about the end 68 of the riser tube 64 below the dish shaped portion 72 and rests upon the radially and horizontally extending flange 78 at the bottom end 68 of the riser tube 64 as shown in FIG. 3.

The disk 76 assumes its first opened condition for the valve means 70 by actuation of gravity in the absence of an upward pressure force thereon. When an upward pressure force is exerted on the valve disk 76, as when the water in the well 62 is sufficiently heated, the disk 76 moves upwardly to its closed position blocking the openings 74 and placing the valve in its closed position. In its closed position the valve means 70 prevents the movement of water from the reservoir 38 through the connecting tube 44 to the well 62 of the heating and pumping means 52. The opening 80 through the riser tube 64, however, remains open at all times to receive heated water and steam generated in the well 62 of the heating and pumping means 52 and for delivering same upwardly to its top end 82, while transferring heat from such water and steam through the riser tube to the water in the connecting tube 44 and reservoir 38.

When it is desirable to further increase the heating and pumping action of the means 52, a supplementary heating element 84 is also provided. The heating element 84 is secured in position by a bracket 86 and fastening screw means 88, with its winding about and in close proximity to the outer surface of the connecting tube 44. The connecting tube 44 is made of a material such as metal to provide good heat transfer characteristics.

Means such as the cord 92 are provided for delivering electrical energization to the heating and pumping means 52 and the element 84 by means of a control circuit 93. The control circuit 93 includes a temperature sensing thermostatic switch 94 and bypass resistor 96. The switch 94 has a temperature sensing portion 95 and is secured about the bottom 50 of the connecting tube 44 by a metal bracket 98 and coil spring 99. The bypass resistor 96 is received in a metal bracket 97 which extends about it. The bracket 97 is positioned above the switch 94 and has a pair of extending ends 101 which are received between the temperature sensing portion 95 of the switch 94 and the connecting tube 44 and retained by the force of the coil spring 99. Heat or cold transmitted by the connecting tube 44 passes through the ends 101 of the bracket 97 to the temperature sensing portion 95 of the switch 94. Heat generated by resistor 96 is conducted by the bracket 97 and through its ends 101 directly to the portion 95 of the switch 94. The control circuit 93 which also includes a main switch 100 will have its operation described in detail in connection with the schematic diagram of FIG. 6.

The cover means 16 which is positioned at the top of the body 14, encloses the opening 40 and may readily be removed for allowing the reservoir 38 to be filled with a desired quantity of cold water in preparation for a coffee brewing operation. The cover means 16 has a top wall 102 and a bottom wall 104 enclosing therebetween a chamber 106. The back portion 108 of the cover means 16 is proximate to the back wall 24 of the body 14 and extends over and covers the opening 40 of the reservoir 38, while the front portion 110 of the cover means 16 extends to the front edges 28 and 30 of the side walls 20 and 22. The bottom wall 104 of the cover means 16 is substantially horizontal sloping downwardly from the back portion 109 to the front portion 110.

The cover means 16 has a first opening 112 provided with an upwardly extending circular edge 114 for removably receiving therethrough the top end 82 of the riser tube 64 as shown in FIG. 3. A second opening or a plurality of openings 116 are provided in the bottom wall 104 at the front portion 110 of the cover means 16 in a downwardly extending arcuate portion forming a spout for dispensing heated water dispensed by the brewing device 10. A third opening 118 is provided in the bottom wall 104 of the cover means 16 at its back portion 108 between the first opening 112 and the rear wall 24. The opening 114 is positioned over the opening 40 of the reservoir 38 when the cover means 16 is positioned over the body 14 as shown in FIG. 3 and is provided with a wall 120 which extends upwardly from the bottom wall 104 proximate to the underside of the top wall 102 of the cover means 16.

The body 14 of the structure 12 has a warming plate 122 secured by bolt means 124 to the base 18 within the recessed region 34 and under the spout openings 116 of the cover means 16. The warming plate 122 has a metal top plate 126 for receiving and supporting thereon a coffee carafe 128, such as that illustrated in FIG. 1 by dash lines, for being warmed by the heating element 130 positioned thereunder. The heating element 130 is connected in the circuit 93 for energization when the switch 100 is in the "on" position to maintain coffee within the carafe 128 at a desirable temperature.

The automatic coffee brewing device 10 is designed for brewing a predetermined number of cups of coffee starting with fresh cold unheated water in a matter of minutes. Thus the device 10 can achieve the brewing of, for example, 72 ounces or 12 cups of coffee of 6 ounces each, in approximately 6 minutes when the cover 16 is removed and 72 ounces of fresh water at 75° F is poured into the reservoir 38. After the reservoir is filled with water, the electrical actuating switch 100 is placed in its "on" position resulting in application of power to the main heating element 58 of the heating and pumping means 52 and to the supplementary heating element 84 when same is utilized. The application to the heating elements of approximately 1500 watts results in the rapid heating of water in the well 62 producing a slug of water and steam, which increases the pressure in the well 62 and closes the valve 70. The high pressure generated in the well 62 results in pumping action, by which the heated water and steam are forced upwardly through the opening 80 in the riser tube 64. In its upward travel, the heated water and steam transmit some of their heat through the walls of the riser tube to the volume of water within the connecting tube 44 as well as to the water in the reservoir 38. Since the volume of water in the connecting tube 44 is smaller than the volume of water contained in the reservoir 38, the same transfer of heat results in a greater rise in temperature for the water contained in the connecting tube 44. The water in the connecting tube 44 is by such means preheated in preparation for being received into the well 62 for the next heating and pumping action.

The heated water and steam which travels upwardly through the riser tube 64 is received from its upper end 82 into the chamber 106 in the cover means 16. The cover means 16 is preferably made of a heat insulating plastic material. The steam which rises to the top of the chamber 106 is vented by the opening 118 into the reservoir 38 where it delivers its heat to the water in the reservoir 38 for further raising its temperature. The heated water which is received over the bottom wall 104 of the cover means 16 flows because of its downward slope towards the front portion 110 and the spout openings 116. Since most of the steam is eliminated by the vent 118, the spout 116 delivers mostly all water which has been reduced in temperature by the heat transfer through the walls of the riser tube 64 to a temperature below its boiling point in the range of 150° to 200° F and preferably 195° F.

The water from the spout opening 116 drops downwardly into a filter 132 positioned under the spout openings 116 and retained at the top of the coffee carafe 128. The filter 132 which may be of a type well known in the art, receives within it a paper filter disk or bag containing ground coffee through which the heated water is passed. The water extracts desired coffee components from the ground coffee beans and is passed through the filter 132 into the carafe 128.

The Coffee Workshop Manual published by the Coffee Brewing Center states that is has been found that for best results it is necessary to begin with fresh cold water while the temperature of the water in contact with the coffee grounds should be within 5° F above or below 200° F. Higher temperatures may result in undesirable coffee flavor while lower temperatures will result in poor extraction, particularly in the lack of proper aroma which contributes much to desirable coffee flavor. The period of time during which coffee is brewed is also of importance and is dependent primarily on the grind, 4 to 6 minutes being desirable for drip grind and 6 to 8 minutes for regular grind. Extending the time beyond those specified, results in the extraction of undesirable elements providing bitterness and astringency to the brew.

After the coffee has passed through the ground coffee beans and filter 132, the filter 132 is removed while the brewed coffee in the carafe 128 is maintained at a desirable temperature for use. Each time after a slug of water and steam are produced in the well 62 of the heating and pumping unit 52 and is caused to move upwardly through the riser tube 64, into the chamber 106 of the cover means 16, the pressure within the well 62 is normalized. This results in movement of the valve disk 76 to its open condition allowing a new charge of preheated water in the connecting tube 44 to move downwardly into the well 62 while the same is replaced in the connecting tube 44 by water from the reservoir 38. Upon the application of sufficient heat to the water in the well 62 of the heating element 58, the pressure is again built up and the valve 70 is again closed resulting in a repetition of the pumping action. This action continues until all of the water in the reservoir and the connecting tube 44 has been dispensed through the spout 116 in the cover means 16. The supplementary heating element 84 assists in the heating and pumping action by adding additional heat to the water within the limited capacity of the connecting tube 44 to the heat which is transmitted through the walls of the riser tube 64.

When the reservoir 38 and connecting tube 44 have delivered their entire content of water to the well 62 of the heating and pumping means 52, the absence of water in the well 62 causes the unit 56 of the heating and pumping means 52 to rise in temperature above 212° F, the boiling temperature of water. This rise in temperature is sensed by the thermostatic switch 94 which is positioned at the bottom 50 of the connecting tube 44 and the top of the heating and pumping means 52. When a predetermined temperature above 212° F is sensed the thermostatic switch 94 opens terminating delivery of electrical energization to the heating elements 58 and 84. Energization, however, is continued to the warming element 130 of the warming plate 122 until the main switch 100 is moved to its "off" position.

In considering the schematic diagram of the electrical circuit 93 in FIG. 6, it is noted that energization such as 110 volts, 60 Herz, is delivered by the cord 92 through the main switch 100 to the lines 134 and 136. An indicator light 138 in series with a limiting resistor 140 are connected between the lines 134 and 136 for indicating the "on" condition of the switch 100 and may be built into the switch 100. The main heating element 58 is connected in series with the thermostatic switch 94 between the lines 134 and 136. When the thermostatic switch 94 is at room temperature or senses a temperature below a first predetermined value, such as when cold water is received in the reservoir 38, the device 10 is conditioned to start a brewing operation. The cold water temperature is transmitted through the connecting tube 44 and bracket ends 101 to the temperature sensing portion 95 of the thermostatic switch 94, activating the thermostatic switch 94 to its closed position. When the main switch 100 is also closed, the main heating element 58 is energized. The supplementary heating element 84 when utilized, is connected in parallel with the main heating element 58. At the end of the brewing operation, the water in the heating and pumping unit 52 is dispensed and the temperature of the heating element 58 and connecting tube 44 about which the thermostatic switch 94 is secured rises to a second predetermined value above the boiling point of water. This heat is transmitted through the metal ends 101 of the resistor bracket 97 to the temperature sensing portion of the switch 94. This activates the switch 94 to its open condition as illustrated in FIG. 6, thereby deenergizing the heating elements 58 and 84.

With the switch 94 in its open condition, current passes through the bypass resistor 96 which is connected across the thermostatic switch 94 and was short circuited by the thermostatic switch when it was in its closed position. The resistor 96 now generates heat which is transmitted by its bracket 97 to the temperature sensing portion 95 of the switch 94. The heat from the resistor 96 is sufficient to maintain the temperature sensed by the thermostatic switch 94 at a level between the first and second predetermined levels to prevent closing of the thermostatic switch 94 and recycling action before the initiation of a new brewing operation. For purposes of illustration only, the resistor 96 can have a 1500 ohm, 5 watt rating for providing the heat required for maintaining the desired temperature level at the thermostatic switch 94 in the absence of water in the connecting tube 44. The resistance of 1500 ohms for such a resistor is also sufficiently high to minimize the current passing therethrough and through the heating elements 58 and 84 connected in series with it, so that the heating elements 58 and 84 are effectively deenergized.

When cold water is again received into the reservoir 38 and connecting tube 44, it overcomes and reduces to below the first predetermined level, the temperature maintained at the temperature sensing portion 95 of the switch means 94 by heat from the resistor 96. When the temperature sensed by the thermostatic switch 94 is thus reduced, the switch 94 is actvated to its closed position short circuiting and thus deenergizing the resistor 96 and allowing energization of the heating elements 58 and 84 to perform a new brewing operation.

The heating element 130 is directly connected between the lines 134 and 136 so that energization is delivered to the warming plate 122 at all times during which the main switch 100 is in its closed position. Thus, after the completion of the brewing operation, and the deactivating of the main and supplementary heating elements 58 and 84, energization is continued to the warming plate 122 to maintain the brewed coffee at a desired temperature.

The configuration and arrangement of the reservoir 38, connecting tube 44, and heating and pumping means 52 providing for the feedback of heat through the riser tube 64 and for the rise of the temperature of water prior to its delivery to the main heating element results in increased efficiency and speed and provides conditions under which a high quality brew is achieved. The use of the supplementary heating element 84 about the connecting tube 44 also assists in achieving the desired brewing operation under particular design circumstances.

The utilization of the cover means 16 providing a chamber 106 therein for returning steam to the reservoir to heat the water therein, while delivering water at its spout openings which has had its temperature reduced to a desired degree with the elimination of steam also increases the efficiency as well as the quality of the brewed coffee.

The electrical circuit 93 provides a means by which automatic operation of the coffee brewing machine 10 is achieved. Thus when a new charge of cold water is received by the device 10, the thermostatic switch 94 is conditioned to assume its closed position resulting in energization of the heating elements 58 and 84 when the main switch 100 is closed. At the termination of the heating operation, when all of the hot water is dispensed, the energization of the heating elements 58 and 84 is substantially terminated by the automatic opening of the thermostatic switch 94. The heating element continues to provide heat required for maintaining the coffee in a carafe 128 at a desirable temperature for use. However, when a new charge of cold water is received in the device 10, the electrical circuit 93 is again conditioned for a new heating operation by the automatic closing of the thermostatic switch 94. Thus, the coffee brewing machine 10, once the main switch 100 is turned on, is automatically conditioned for brewing coffee each time a new charge of cold water is received thereby, while being minimally energized between brewing operations.

While the invention has been described and illustrated with reference to a specific embodiment it will be understood that the invention is capable of various modifications and applications not departing essentially from the spirit thereof, which will become apparent to those skilled in the art.

What is claimed is:

1. In an automatic coffee brewing machine of the type having a structure with container means for receiving cold water at the start of a brewing operation and dispensing hot water at the end of the brewing operation, a control means comprising heating means for heating a container means and the water received therein, a switch means for sensing the temperature of said container means and the water contained therein and having an open position and a closed position, said switch means being activated to its closed position when sensing a temperature below a predetermined first value and being activated to its open position when it senses a temperature above a predetermined second value higher than said first value, electrical connecting means joining said switch means with said heating means for providing energization of said heating means when said switch means is in its closed position, and a heating element for heating said switch means to a temperature between said first and second values when said switch means is in its open position, so that when said switch means is in its closed position at the start of a brewing operation the heating means is energized through said switch means to heat the container means and the water contained therein until said switch means is activated to its open position when the temperature of said container means exceeds said second value after which said heating element maintains the temperature sensed by said switch means at a level between said first and second values which prevents said switch means from being activated to its closed position and reheating said container before the start of a new brewing operation.

2. The means of claim 1 in which said heating element is connected across and positioned proximate to said switch means.

3. The means of claim 2 in which said heating element is a resistor supported by a heat conducting bracket transmitting heat to said switch means.

4. The means of claim 1 in which said switch means is a thermostatic switch which is in its closed position at room temperature.

5. The means of claim 1 in which said switch means is a thermostatic switch which is activated to its open position when it senses a temperature which is above the boiling point of water.

6. The means of claim 1 in which the switch means is activated to its closed position when sensing a temperature below said predetermined first value when said container receives cold water at the start of a brewing operation.

7. The means of claim 1 in which said switch means is series connected with said heating means for receiving energization and said heating element is connected across said switch means for being energized when said switch means is in its open position.

8. The means of claim 7 in which said connecting means includes a main switch series connected with said heating means and having a closed position for delivering energization from an energy source and an open position preventing delivery of energization, whereby when said main switch is closed energization is delivered to the heating means through said temperature sensing switch means when said switch means is in its closed position and energization is delivered to said heating element when said temperature sensing switch means is in its open position.

9. The means of claim 8 in which said heating element is a resistor, said temperature sensing switch means is normally closed at room temperature, is activated to its open position when it senses a temperature which is above the boiling point of water, is maintained in its open position by heat from said heating element when said switching means is in its open position, and is activated to its closed position when sensing a temperature below said predetermined first value when said container receives cold water at the start of a brewing operation.

10. The means of claim 7 including a warming plate, and a heating element connected across said heating means and said temperature sensing switch means for receiving energization and heating said plate when said main switch is closed.

11. The means of claim 1 including heat conducting means for delivering heat from said heating element to said switch means.

12. The means of claim 11 in which saiid switch means has a heat sensing portion contacting said heat conducting means.

13. The means of claim 12 in which said heat conducting means is a metal bracket supporting said heating element proximate to said switch means.

14. The means of claim 13 in which said container means has a heat conducting portion, and including mounting means for supporting said switch means proximate to a heat conducting portion of said container means for sensing the temperature of said heat conducting portion.

15. The means of claim 14 in which said metal bracket has a contact portion positioned between and in contact with the temperature sensing portion of said switch means and the conducting portion of said container means, whereby said switch means senses temperature by means of heat derived from said heating element by contact with the contact portion of said bracket and from heat passing between and through the conducting portion of said container and the contact portion of said bracket positioned between and in contact with the conducting portion of said container and the temperature sensing portion of said switch means.

16. The means of claim 1 in which said container means is of the type having a reservoir with a heat conductive connecting tube joined to said heating means for delivery of water from the reservoir to the heating means, including first mounting means for supporting said switch means proximate to the connecting tube of said container means and second mounting means for supporting said heating element proximate to said switch means.

17. The means of claim 16 in which said switch means has a temperature sensing portion and said second mounting means is a metal bracket having a contact portion contacting the temperature seneins portion of said switch means for delivering heat from said heating element to said switch means.

18. The means of claim 17 in which the contact portion of said metal bracket is positioned between and in contact with the temperature sensing portion of said switch means and the connecting tube of said container means, whereby said switch means senses temperature by means of heat derived from said heating element by contact with the contact portion of said metal bracket and from heat passing between and through said connecting tube and the contact portion of said bracket positioned between and in contact with said connecting tube and the temperature sensing portion of said switch means.

19. The means of claim 18 in which said first mounting means comprises a unit with oppositely extending ends supporting said switch intermediate thereto with its temperature sensing portion directed toward said connecting tube and a spring have ends joined to the ends of said unit and extending and tensioned about said connecting tube for retaining said first mounting means in position on said connecting tube.

20. The means of claim 19 in which said heating element is a resistor, and said second mounting means has a body portion received about and being heated by said resistor when said resistor is energized and an extending flat portion which extends downwardly and is received between said connecting tube and the temperature sensing portion of said switch means and is retained and secured in position by the tension of the spring of said first mounting means.

* * * * *